April 10, 1928.
E. N. BACHELDER
1,665,199
APPARATUS FOR INFUSING AND FILTERING COFFEE, TEA, AND THE LIKE
Filed June 15, 1927
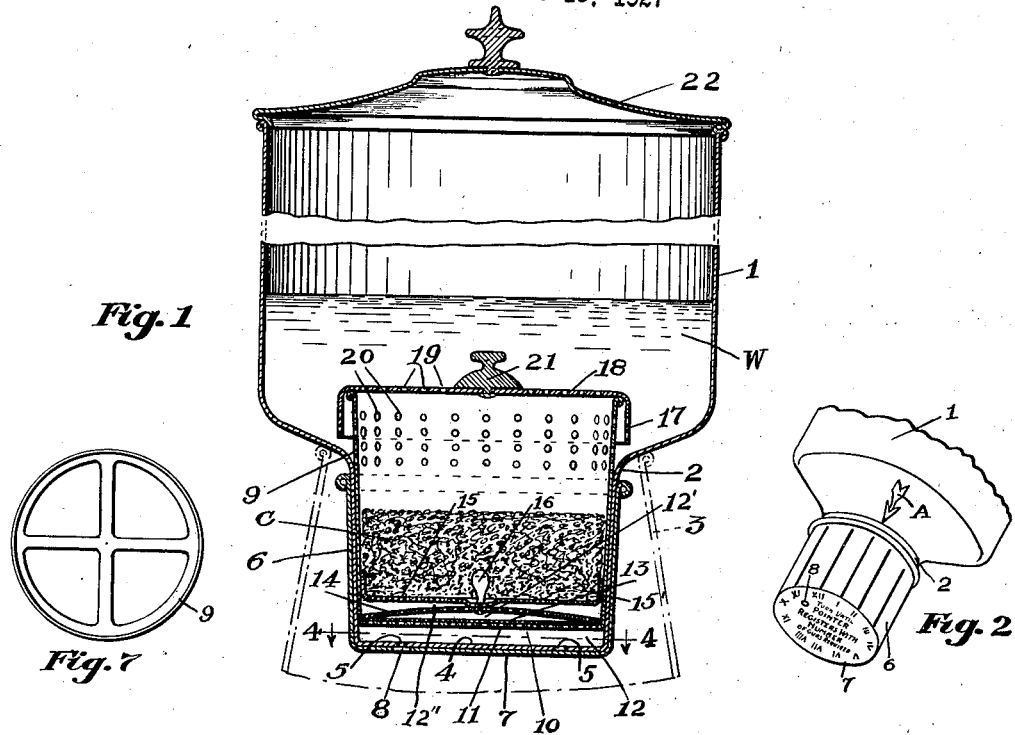
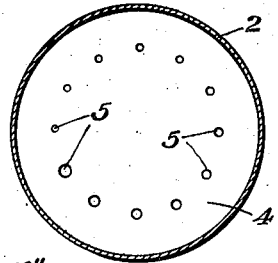
Fig. 2
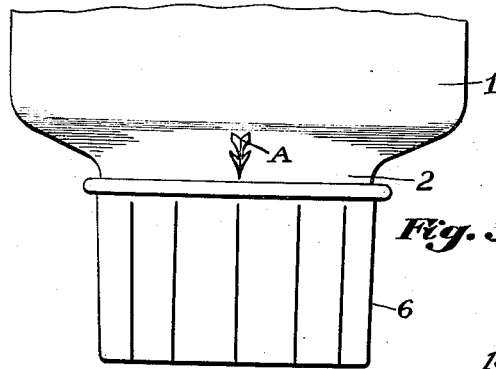
Fig. 3
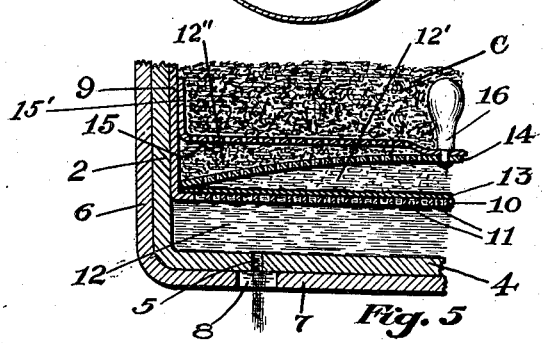
Fig. 5
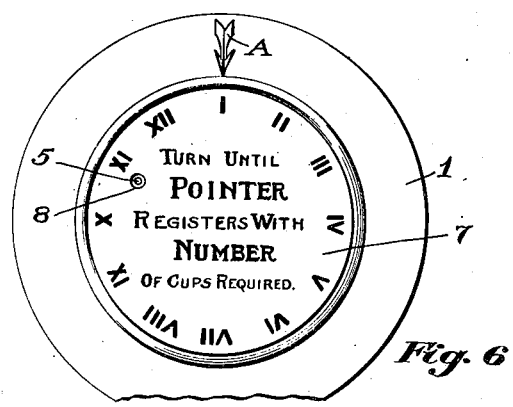
Fig. 6
*Inventor:*
ELMER N. BACHELDER.
BY—
Henry L. Chenery.
ATTORNEY.

Patented Apr. 10, 1928.

1,665,199

UNITED STATES PATENT OFFICE.

ELMER N. BACHELDER, OF PORTLAND, MAINE.

APPARATUS FOR INFUSING AND FILTERING COFFEE, TEA, AND THE LIKE.

Application filed June 15, 1927. Serial No. 198,970.

For several centuries the coffee bean and the tea leaf have served mankind as the important elements in the preparation of two of the most commonly and extensively used beverages.

The methods employed in procuring these beverage extractions have varied from time to time, but, until comparatively recent years the old, conventional way,—that of boiling these products—has for the most part been the prevailing practice.

With the advance in the knowledge of dietetical matters it has become known that in the brewing or steeping of coffee or tea certain constituent parts thereof, as caffeine in coffee and theine in tea, feebly basic alkaloids, are liberated, and it is now quite generally agreed by dietitians that these elements in the beverages mentioned are deleterious to the health of human beings if taken in any considerable quantities and thereby constitutes a menace to the welfare of humanity, which, however, may be avoided by taking proper precautionary measures.

In a hygienical sense, the only proper way to obtain the most desirable beverages of this class is by the adoption of the infusion method, about which my present invention relates, and of which one general object is to provide the proper utensil by which this process may be put into effect.

Particularly in the case of coffee, it is obvious that to start the infusing action quickly and accomplish the task satisfactorily, boiling water must or should be used. Due to the fact, however, that caffeine is likely to be liberated from the finely ground coffee after a too prolonged immersion of the latter in the water, certain measures must be taken to regulate and limit the extent of the infusion period.

It is, therefore, a specific object of my device to provide means to accurately gauge and restrict the time during which the water is passing through the coffee and also to provide means whereby this time shall be of similar duration in all cases, regardless of the amount of water used in the operation.

To accomplish this last mentioned object, I provide a plurality of apertures in the bottom head of the water container, these apertures increasing successively in size from the smallest to the largest, and each, singly, capable of being placed in register with a large aperture in the head of the outside cup when the latter is rotated on the lower end of the container.

Capacity-indicating characters are cut, embossed or inscribed on the end and periphery of the outer cup, making it an easy matter to select the proper aperture to use in connection with any particular number of cups of coffee it is desired to make.

As the infusing water will carry down more or less of the finely ground coffee with the drippings, I provide, and have for another object, a filtering element preferably in the form of porous filter-paper, after passing through which the beverage is clear and free from particles of the solid coffee.

A further object is to provide a two-stage strainer comprising a coarsely perforated upper disc and a finely perforated lower disc, the upper disc supporting the main bulk of the coffee but allowing a certain amount of the smaller grains to pass down on to the lower one where they are held in check except for the very minutest particles which finally drop on to the filtering element. It is obvious that in this arrangement the filter-paper is not over-loaded and can accomplish the filtration in a much quicker time and a more thorough manner.

A still further object concerns the matter of confinement of the bulk coffee within the receptacle designed to hold it. Frequently the receptacle is nearly if not quite filled with coffee at the start of operations and adding the hot water swells it to such an extent that it overflows the receptacle; furthermore, when a considerable quantity of water is poured over dry coffee a certain amount of the latter will float and be carried outside the receptacle. To overcome this difficulty I provide a weighted cover having a deep circumferential flange which allows of considerable vertical movement of the cover while the flange yet remains in engagement with the upper end of the receptacle,—providing extensibility to the latter.

With these and other objects in view the invention consists in the novel features of construction and arrangement of parts capable of fulfilling the foregoing objects and having characteristics which I will now describe in connection with one specific embodiment which, at the present time, I consider preferable to other possible forms of the invention.

In the drawings,—

Fig. 1 is a central, sectional elevation of my apparatus;

Fig. 2 is a fragmentary perspective view of the lower portion of the device, somewhat reduced in size;

Fig. 3 is a fragmentary elevation of the same;

Fig. 4 is a sectional plan of the lower end of the water container, showing the bottom and the perforations therein, section being taken on line 4—4, Fig. 1;

Fig. 5 is an enlarged, fragmentary central sectional elevation, illustrating the successive stages of straining and filtration;

Fig. 6 is an inverted plan of the apparatus, and

Fig. 7 is a modified design of the coffee receptacle bottom.

Similar characters of reference identify similar parts throughout.

Referring to Fig. 1, 1 represents the upper portion of a water container and 2 the lower portion greatly reduced in size and slightly tapering. Its form is such that it may be placed in the top of any suitable serving crock, pot or pitcher 3.

The container bottom is provided with a circular row of apertures 5, each differing from the others and increasing successively by slight amounts in size from the smallest to the largest.

Encompassing the lower portion 2 of the water container is a cup-shape member 6, tapering similarly to the portion 2 and making a water-tight fit or joint thereover.

The bottom end 7 of the cup 6 has one large aperture 8 located on an arc coincident with the arc or circle which cuts the centers of the apertures 5, the size of the aperture 8 being as large, at least, as the largest in the series of apertures 5.

The tapering fit between the members 2 and 6 is such that the latter may be wrung on to the former so as to be frictionally secure; and when thus brought to a seat on the tapered portion the adjacent surfaces of the bottoms 4 and 7 of the two members 2 and 6, respectively, make a close and substantially water-tight contact.

By reference to Figs. 2 and 6 there will be observed certain characters in the form of Roman numerals, I, II, III,—XII, which are engraved, stamped or imprinted on the bottom head 7 of the member 6; also lines extending from each numeral, upwardly, so as to be within registering distance of the arrow A serving as a pointer and co-acting with the lines to bring any particular aperture 5 into register with the aperture 8. It is obvious that these characters and lines may be otherwise arranged to effect the visual placement of the parts to bring about the proper register.

Further characters in the nature of an instructional inscription serve for those unacquainted with the operation of the device as an almost indispensable element in the successful handling of the apparatus. The words,—"Turn until pointer registers with number of cups required", are simply suggestive,—some other directional phrase may be substituted. The function of these characters in their relation to and as they coordinate with other elements in the combination will be hereinafter more fully described.

Fitting closely the inside of the portion 2 is another cup-shape member 9 serving as a coffee receptacle. Through its bottom 10 and embracing its whole area are relatively large perforations 11. When this member 9 is fully seated in the portion 2 of the water container, the bottom 10 of the former and the bottom 4 of the latter are separated by the space 12 which constitutes a chamber for the strained and filtered liquid coffee,—the latter acting, when the chamber is full, as a dam to prevent too rapid movment downwardly of the infusion water through the coffee. It might be well to state that in practically all cases the rate of filtration is greater than the rate of discharge through the apertures 5, thus insuring a completely filled chamber, after once becoming filled, until such time as the receptacle has been completely drained of the infusion water.

Lying on the top of the bottom head 10 of the coffee receptacle is a filtering element 13, preferably made of filter-paper. It is cut in the form of a plain disc and lies flat on the perforate bottom, just filling the diameter of the cylindrical portion 9 of the receptacle. A modified design of the bottom 10 is shown in Fig. 7, involving the use of cross-bars to support the filter-paper instead of the perforated disc.

Superimposed on the filter-paper disc 13, and contacting therewith on its marginal portions only, is a finely perforated disc 14, bumped or dished upwardly so that its under side presents a concave surface. In securing the filter-paper in this manner it will always lie flat and smooth on the supporting disc 10 and wrinkles, which might develop should it be folded around the edges of the disc 14, eliminated as a possibility. It will also be observed that in this construction a space or chamber 12' is provided directly above the filtering element 13.

Located above the disc 14 is a coarsely perforated disc 15 with an upstanding peripheral flange 15' fitting closely the wall of the coffee receptacle 9. These two discs, 14 and 15, are preferably, although not necessarily secured together by the rivet-end handle 16 by which they may be removed from the receptacle; in any event, however, they are arranged so that a space 12″ is provided between them.

It will be observed that the cylindrical portion of the coffee receptacle 9 is extended upwardly for a considerable distance into the water container space above the contracted lower portion. This is done for the purpose of providing operating space for the flange 17 of the cover 18.

In describing the function of this combined cover and flange element let it be assumed that a quantity of coffee beverage is required to be made necessitating the almost complete filling of the receptacle with dry coffee. When the hot water is added, portions of the coffee will naturally rise and would otherwise float out of the receptacle were it not for the cover. As the coffee swells, its bulk rises to the cover, and, in case the latter was unyieldingly secured to the receptacle, further swelling of the coffee would compact it to such an extent that it would be difficult for the water to precolate through it. But since in the present case the cover acts in an extensible manner, due to the flange telescoping the receptacle body, the excess bulk of swollen coffee may rise, but it will be retained within the space embraced by the cover and flange as these latter rise; there is thus provided what really amounts to an extension of the receptacle body.

If water be poured directly on to coffee in a coverless receptacle a considerable quantity of the water will pass too quickly through the bulk. I perforate my cover and the upper portion of the receptacle body with fine holes, 19 and 20, respectively, these perforations being small enough to prevent the coffee escaping from the receptacle but ample to allow the water to enter the bulk of the coffee from the water container in small jets and percolate therethrough in a more gradual manner.

For the purpose of subjecting the swelling coffee to a yielding resistance to upward expansion, I provide a weight 21 on the cover which, while tending to slightly compact the bulk, does not render it impermeable to the infusion water.

A lid 22 serves to close the top of the water container.

Referring to Fig. 5 it will be seen that my method of preparing coffee beverage contemplates the passing of the infusion water through a two-stage straining process and then subjecting it to a filtering treatment which effectually clears it of all fine particles, a difficult accomplishment when using pulverized coffee.

I have demonstrated that from 25 to 30 per cent more of the valuable flavoring qualities of the coffee can be extracted with this method, even when limited to the short infusion period, than can be procured by dumping the coffee directly on to the filter-paper. It will be observed that the bulk of the coffee is supported on the disc 15, the perforations in which are large enough to allow a certain amount of the smaller grains to pass through them into the chamber 12″ and on to the disc 14 where they are held until, in the process of infusion, small particles are thrown off by the disintegration of the coffee grains and pass downwardly through the finer perforations in the disc 14 into the space or chamber 12′ to be collected by the filtering medium 13. All that this filtering element is thus required to do is to clear the solution in the space 12′ of the very finest particles and it therefore remains in a condition tending to enhance the speed of the filtering operation and keep it uniform and constant, without which characteristic the apparatus would fail to accomplish the results required and desired in this process.

In operating my infusion and filtering device the filter-paper disc 13 is first placed in the bottom of the coffee receptacle 9 and the two-stage strainers forced into position thereover.

The required amount of coffee, C, to make the desired number of cups of beverage is next turned into the receptacle and the weighted cover 18 placed in position on the receptacle.

Supposing, for instance, that four cups of the beverage are desired to be made. The outer cup 6 is forced tightly on to the portion 2 of the water container after first rotating it so that the character IV and its adjacent index line register with the arrow A. This operation brings the fourth hole in the series of apertures 5 into alignment with the aperture 8 in the head 7. The coffee receptacle is now located in the portion 2 of the water container and four cups of boiling water, W, poured into the latter subsequent to placing the whole apparatus in some suitable beverage receiver 3.

The proper duration of time to infuse coffee as ordinarily ground and during which there is little or no liberation of caffeine, is generally considered to be from six to eight minutes.

The size of the apertures 5 are closely calculated and predetermined from actual experimentation to fulfill the requirement of discharging the liquid in the above stipulated time, so that whether one, two, or any other specific number of cups of beverage are called for, the actual time consumed in the infusion process will be identical in all cases,—automatically effected by following the simple instructions marked on the apparatus, the character I signifying the position of the outer cup when this character registers with the arrow, II being for two cups, and so on. The preparation of the beverage will thus be accomplished in a simple, automatic and scientific manner.

Having thus described my invention, what I claim and wish to secure by Letters Patent is:

1. In apparatus of the class described, comprising a water container having a perforate bottom end, a coffee receptacle within and closely fitting the wall of said water container and having relatively large perforations in its bottom end, said bottom end being disposed in vertically spaced relation to the bottom end of said water container, a porous filtering element superjacent and completely covering the bottom end of said coffee receptacle, an upwardly-dished disc having contact with the marginal portions only of said filtering element and being provided with relatively small, closely spaced perforations over its entire dished surface, a perforate cover overlying said coffee receptacle, a weight on said cover, and a relatively deep, downwardly extending flange on said cover adapted to slidably engage and enclose the upper, cylindrical portion of said coffee receptacle.

2. In apparatus of the class described, comprising a water container, a bottom head therefor having a plurality of apertures therein, a coffee receptacle within said container having a perforate bottom end disposed in spaced relation to the bottom head of said water container, a porous filtering element within said coffee receptacle and adapted to lie on the perforate bottom thereof, a two-stage strainer located above and in vertically spaced relation to said filtering element except at the marginal portions thereof, said strainer including an upper, coarsely perforated disc and a lower finely perforated disc, the said filtering element and the said discs so arranged as to provide interjacent chambers, and a perforate, weighted cover for said coffee receptacle.

3. In apparatus for infusing coffee, tea and the like, comprising a water container having a contracted lower portion, a bottom head therefor having a plurality of apertures arranged concentrically with the axis thereof and successively increasing in size from the smallest to the largest, a revoluble cup tightly engaging, when fully seated, the outer sides and bottom of the said contracted lower portion of said water container and having a single aperture therein adapted to register in succession, when said cup is revolved, with any one of the said plurality of apertures in said water container bottom head, a coffee receptacle tightly fitting the interior of the lower portion of said water container and having in its bottom end and upper side portions a plurality of perforations, a perforate cover surmounting said coffee receptacle, a weight on said cover, a downwardly extending flange on said cover adapted to slidably engage the upper end of said coffee receptacle, a porous filtering element disposed within said coffee receptacle adjacent the bottom end thereof, a disc having a plurality of relatively small perforations therein located within said coffee receptacle and contacting with said filtering element on the upper, marginal portions thereof only, the lower surface of said disc inwardly from its marginal contacting portion being disposed in spaced relation to said filtering element, a flanged disc having a plurality of relatively large perforations therein located above said first mentioned disc and so arranged with respect thereto as to provide a chamber therebetween, capacity-indicating characters on the exterior of said revoluble cup, a pointer on said water container, said characters and said pointer adapted to serve conjointly as visual locating means whereby said revoluble cup may be predeterminately positioned to bring into action any one of the said plurality of various size apertures in the bottom end of said water container.

In testimony whereof I affix my signature.

ELMER N. BACHELDER.